US 6,697,393 B2

(12) United States Patent
Kasamatsu et al.

(10) Patent No.: US 6,697,393 B2
(45) Date of Patent: Feb. 24, 2004

(54) LASER AMPLIFIER, METHOD AND APPARATUS FOR LASER AMPLIFICATION, AND LASER OSCILLATOR

(75) Inventors: Tadashi Kasamatsu, Tokyo (JP); Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 09/794,226

(22) Filed: Feb. 28, 2001

(65) Prior Publication Data

US 2002/0075909 A1 Jun. 20, 2002

(30) Foreign Application Priority Data

Feb. 29, 2000 (JP) ........................................ 2000-054474

(51) Int. Cl.$^7$ .............................................. H01S 3/102
(52) U.S. Cl. .......................................... 372/23; 372/24
(58) Field of Search ..................................... 372/23, 24

(56) References Cited

U.S. PATENT DOCUMENTS

| 5,191,467 A | * | 3/1993 | Kapany et al. | ............. 359/337 |
| 5,341,237 A | * | 8/1994 | Tohmon et al. | .......... 359/341.5 |
| 6,411,432 B1 | * | 6/2002 | Kasamatsu | ............. 359/341.33 |
| 6,434,172 B1 | * | 8/2002 | DiGiovanni et al. | ........... 372/6 |

FOREIGN PATENT DOCUMENTS

| JP | 03-289186 | 12/1991 |
| JP | 05-275792 | 10/1993 |
| JP | 2001-007426 | 1/2001 |
| JP | 2001-024263 | 1/2001 |
| WO | WO 01/33679 A1 | 10/2001 |

OTHER PUBLICATIONS

Japanese Office Action with English translation of pertinent portions dated Feb. 12, 2003.
Electronics Society Conference OF IEICE 1999; "Gain Enhancement and shift of Tm–doped fiber amplifier by using a dual–wavelenghth (1.05/1.56pm) pump scheme" Tadashi Kasamatsu; Yutaka Yano; Hitoshi Sekita.
Electronics Letters 23$^{rd}$ Nov. 1989 vol. 25 No. 24 Tunable CW Lasing around 0.82, 1.48, 1.88 and 2.35um in Thulium–doped Fluorozirconate Fibre.
Reliable operation of strain–coompensated 1.06um InGaAs/ InGaAsP/GaAs sinle Quantum well lasers, Appl. Phys. Lett. 69 (2), Jul. 8, 1996 American Inst. of Physics.
Upconversion pumped Thulium–doped Fluoride Fiber Amplifier and Laser Operating at 1.47um, IEEE Journal of Quantum Electronics vol. 31, No. 11 Nov. 1995.
Japanese Office Action with English translation of pertinent portions dated Jun. 10, 2003.
An article from Electronic Letters, date Sep. 14, 2000 vol. 36 No. 19.

* cited by examiner

*Primary Examiner*—Paul Ip
*Assistant Examiner*—Jeffrey N Zahn
(74) *Attorney, Agent, or Firm*—Whitham, Curtis & Christofferson, P.C.

(57) ABSTRACT

Two semiconductor laser light sources for outputting light of two properly selected wavelengths are employed as excitation light sources. That is, as excitation light sources, there are used a first semiconductor laser excitation light source for exciting ion from a base level to a laser low level or an energy level higher than the laser low level and a second semiconductor laser excitation light source having a wavelength different from that of the first excitation light source for exciting ion from a laser low level to a laser high level. For example, an amplification fiber uses a fluoro zircon ate glass as a base material. Two multiple wavelength couplers are disposed at the input side of the amplification fiber. The multiple wavelength couplers are connected to the first excitation light source and the second excitation light source, respectively. An isolator is disposed at a signal input port at the further input side of the multiple wavelength couplers, and an another isolator is disposed at an output port of the amplification fiber.

10 Claims, 7 Drawing Sheets

US 6,697,393 B2

LASER AMPLIFIER, METHOD AND APPARATUS FOR LASER AMPLIFICATION, AND LASER OSCILLATOR

BACKGROUND OF THE INVENTION

1. Field of the Invention

The present invention relates to a laser amplifier and oscillator using a medium doped with a rare earth element as a gain medium and using a semiconductor laser as an excitation light source, and a method and apparatus for laser amplification using the same.

2. Description of the Related Art

A laser apparatus using a crystal or glass medium doped with a rare earth element as an active medium, that is, a laser oscillator and amplifier or the like is widely applied to information communication industries and mechanical engineering fields. An optical fiber amplifier in a large yield solid laser for metal processing and an optical fiber communication system is a typical example of its application.

The efficiency, size, service life, and mechanical stability of the laser oscillator and amplifier are mainly determined depending on an excitation light source. A semiconductor laser used as an excitation light source is superior to a solid laser and a fiber laser in these respects. Therefore, considering equipment applicability, it is preferred to employ a system (LD excitation system) using a semiconductor laser (laser diode: LD) as an excitation light source. A solid laser and a fiber laser used as an excitation light source have many more disadvantages than the semiconductor laser in various respects. In particularly, apart from the fact that the solid and fiber lasers are disadvantageous as compared with the LD in view of efficiency, size, mechanical stability, and service life, these lasers are disadvantageous in that a small number of passive optical parts in a bandwidth of 1.05 µm in wavelength is provided. For example, an optical isolator with its low loss and high isolation is not practically used.

In such a laser apparatus, energy is supplied to rare earth ion by means of light excitation. Thus, in order to ensure operation with high efficiency, it is particularly important to select a wavelength of an excitation light source. However, some kinds of rare earth ions do not match well a wavelength of a semiconductor laser in optimal excitation wavelength, i.e., ion absorption wavelength bandwidth, making it difficult to ensure LD excitation caused by a semiconductor laser with its single wavelength. Thus, it may be required to use a light source other than LD. In particular, in the case where an ion forming a self-termination system whose laser low level service life is longer than laser high level service life is used as a gain medium, as shown in the following example, the wavelength of excitation light is limited more significantly, thus making it more difficult to ensure LD excitation.

As an example, a case of a Tm (thulium) ion in a fluorine glass will be described here. When a rare earth element such as Tm is doped in a medium such as fluorine glass, the element is ionized in the medium to form a Tm ion. FIG. 1 is an energy level chart showing a conventional method of exciting a thulium fiber amplifier. In addition, the wavelength of the conventional excitation light is explicitly shown in the figure. FIG. 2 is a graph illustrating an ASE (amplified spontaneous emission) spectrum when a transition shown in FIG. 1 is generated. As shown in FIG. 1, in a fiber amplifier in which a Tm ion is doped in a core, 1.04 to 1.07 µm (hereinafter, referred to a bandwidth of 1.05 µm) is used as an excitation wavelength, whereby light amplification of 1.47 µm bandwidth in wavelength (transition from $^3F_4$ to $^3H_4$) can be achieved. In the figure, the light amplification is explicitly shown as a transition "a". In addition, at this time, an ASE spectrum as shown in FIG. 2 can be obtained. In more detail, this fact is disclosed in IEEE Journal of Quantum Electronics, Vol. 31, page 1880, 1995; Japanese Patent Application No. 11-156745; and Optics Letters, Vol. 24, page 1684, 1999.

In such a fiber amplifier, as shown in FIG. 1, an excitation photon with its 1.05 µm bandwidth causes Tm ion base level absorption (transition from $^3H_6$ to $^3H_5$), and further causes non-radiation transition (not shown) and excitation state absorption (transition from $^3H_4$ to $^3F_2$ or transition from $^3F_4$ to $^1G_4$). Then, an inversion distribution is formed between $^3F_4$–$^3H_4$ levels due to two-stage transition. The reason why this technique is efficient is that Tm ion base level absorption spectrum and excitation level absorption spectrum are superimposed in wavelength of 1.05 µm, thus making it possible to ensure excitation with single excitation light of 1.05 µm in wavelength.

However, in the above-mentioned Tm doped fiber amplifier, it is difficult to ensure excitation of 1.05 µm bandwidth with a semiconductor laser. This is because, although laser light oscillation of 1.05 µm bandwidth in a semiconductor laser is reported in some research papers, an apparatus capable of achieving a practical yield power level, for example, a transverse single mode yield of about 500 mW, does not exist in research level and commercially available level. For example, as disclosed in Applied Physics Letters, Vol. 69, page 248, 1996, the current semiconductor laser yield of 1.06 µm in wavelength is about 200 mW. The current semiconductor laser yield disclosed in the paper is too small to ensure excitation in the above-mentioned Tm doped fiber amplifier. And the yield of commercially available semiconductor laser is smaller than that.

For such reasons, in a conventional Tm-doped fiber amplifier, as an excitation light source of 1.05 µm bandwidth, for example, there is used LD excited solid lasers such as Nd: YAG, Nd: YLF, Yb: YAG; or LD excited fiber laser such as Yb doped fiber lasers, for example.

On the other hand, although excitation light source other than 1.05 µm bandwidth, for example, excitation of 0.79 µm bandwidth that directly excites $^3F_4$ level, for example, (wavelength of 0.77 to 0.80 µm and transition "b" in FIG. 1) and 0.67 µm bandwidth that excites $^3F_2$ level (a wavelength of 0.64 to 0.68 µm and transition "c" in FIG. 1) can perform LD excitation, for example, as disclosed in Electronics Letters, Vol. 25, page 1660, 1989, the ion number density of laser low level ($^3H_4$) increases, and an inversion distribution cannot be maintained in a constant state, making it impossible to ensure operation with high efficiency. This is because the laser low level service life is about 10 msec in Tm ion, which is longer than the laser high level service life ($^3F_4$ service life is 1.3 msec). Such a system is called self-termination system, which is observed in rare earth elements Er (Erbium) and Ho (Holmium) or the like other than Tm.

In a laser amplifier and oscillator using a rare earth element forming its self-termination system, in order to ensure operation with high efficiency, it is essentially required to provide excitation light serving to excite ion from a base level to laser low level or an energy level above the laser low level; and excitation light serving to excite ion from laser low level to laser high level, and to form an inversion distribution. As described above, the excitation light of 1.05 µm bandwidth in Tm can play these two roles at the same time, but LD excitation is impossible.

As shown in the above example, in the case where a medium in which an ion forming its self-termination system is doped is employed as a gain medium, an excitation wavelength is limited, thus making it difficult to ensure LD excitation.

SUMMARY OF THE INVENTION

It is an object of the present invention to provide a laser amplifier, a method and an apparatus for laser amplification, and a laser oscillator, which uses a medium doped with a rare earth element forming its self-termination system transition, in which semiconductor laser excitation is enabled and high efficiency, miniaturization, extended service life, and highly stable operation can be ensured at the same time.

A laser amplifier according to the present invention is directed to a laser amplifier using a medium doped with a rare earth element as a gain medium, and employing inductive discharge transition between two energy levels higher than a base level among energy levels of rare earth ion in the medium. The inductive discharge transition forms a self-termination system transition whose laser low level service life of the two energy levels is longer than laser high level service life of the two energy levels. The laser amplifier comprises: a first excitation light source for exciting ion from a base level to the laser low level or an energy level upper than the laser low level; and a second excitation light source having a wavelength different from that of the first excitation light source and for exciting ion from the laser low level to the laser high level, wherein at least one of the first and second excitation light sources is composed of a semiconductor laser.

In addition, the laser amplifier of the present invention can use fluoro zircon ate glass as the medium doped with a rare earth element.

Further, in the laser amplifier of the present invention, the rare earth ion may be thulium ion ($Tm^{3+}$) and the first excitation light source may have any one of three wavelength ranges from 1.53 $\mu$m to 1.90 $\mu$m, 0.77 $\mu$m to 0.80 $\mu$m and 0.64 $\mu$m to 0.68 $\mu$m and the second excitation light source may have a wavelength range of 1.35 $\mu$m to 1.46 $\mu$m. In addition, the laser amplifier of the present invention preferably has an optical fiber shaped medium.

A laser amplification method according to the present invention arranges a plurality of laser amplifiers including the above-mentioned laser amplifier in series or parallel, thereby broadening a gain in bandwidth.

A laser amplification apparatus according to the present invention has a plurality of laser amplifiers including the above-mentioned laser amplifier arranged in series or parallel.

A laser oscillator according to the present invention is directed to a laser oscillator using a medium doped with a rare earth element as a gain medium, and employing inductive discharge transition between two energy levels higher than a base level among energy levels of rare earth ion in the medium. The inductive discharge transition forms a self-termination system transition whose laser low level service life of the two energy levels is longer than laser high level service life of the two energy levels. The laser oscillator comprises: a first excitation light source for exciting ion from a base level to the laser low level or an energy level upper than the laser low level; and a second excitation light source having a wavelength different from that of the first excitation light source and for exciting ion from the laser low level to the laser high level, wherein at least one of the first and second excitation light sources is composed of a semiconductor laser.

The laser oscillator of the present invention can use fluoro zircon ate glass as the medium doped with a rare earth element.

Further, in the laser oscillator of the present invention, the rare earth ion may be thulium ion ($Tm^{3+}$) and the first excitation light source may have any one of three wavelength ranges from 1.53 $\mu$m to 1.90 $\mu$m, 0.77 $\mu$m to 0.80 $\mu$m and 0.64 $\mu$m to 0.68 $\mu$m and the second excitation light source may have a wavelength range of 1.35 $\mu$m to 1.46 $\mu$m.

In the present invention, in a laser amplifier and oscillator in which a rare earth element forming a self-termination system transition is doped, a semiconductor laser light source having two properly selected wavelengths is used as an excitation light source.

First, two excitation light actions in the present invention will be described. A first excitation light excites ion from a base level to a laser low level or an energy level above the laser low level. This first excitation light serves to efficiently excite ion to an energy level group associated with inductive discharge transition, i.e., to laser high level and laser low level. At this time, the first excitation light may not necessarily excite ion up to an energy level above the laser high level. In addition, in the case where irradiation is performed with only the first excitation light, since the energy level is a self-termination system, the ion number density of the laser low level increases, and a constant inversion distribution is not formed.

Next, ion is excited from the laser low level to the laser high level by means of a second excitation light. In this manner, an inversion distribution is formed between desired energy levels, and laser amplification operation in its inductive discharge transition is achieved.

As the first excitation light, there may be selected a wavelength that matches base level absorption transition to a laser low level or an energy level above the laser low level. As compared with a case of single wavelength excitation, much more selections can be made, and semiconductor laser excitation is also possible. As the second excitation light, there may be selected a wavelength that corresponds to an energy gap between the laser high level and the laser low level. This can be accomplished by selecting a light source with its wavelength slightly shorter (about 0.02 to 0.10 $\mu$m) than the inductive discharge transition wavelength of interest. The second excitation light can be achieved by the semiconductor laser as long as the inductive discharge transition can be achieved by the semiconductor laser.

In addition, in an excitation arrangement of the present invention, in the case where a wavelength of the first excitation light is set so as to correspond to an energy gap between the base level and the laser low level, energy conversion efficiency, i.e., slope efficiency becomes maximal. The reason is stated as follows. In general, an energy loss component due to non-radiation transition becomes a main cause of lowering energy conversion efficiency. However, in the case where the wavelength of excitation light is set as described above, the energy loss component lost by non-radiation transition is very small. In simple estimation that ignores the width of each energy level, in the case of 1.05 $\mu$m excitation in a Tm doped fiber amplifier, the theoretical maximum value $\eta$s of the slope efficiency of the fiber amplifier is 1.05/1.46/2=36%. However, in the case where the wavelength of the first excitation light is defined as 1.56 $\mu$m, and the wavelength of the second excitation light is defined as 1.46 $\mu$m, the slope efficiency reaches 50%. In the case of the laser oscillator, this tendency is more significant. With respect to the theoretical slope efficiency in excitation power that is about 5 times of threshold, in the case of 1.05 μm excitation, ηs=73%. However, in the case of 1.42 μm excitation+1.56 μm excitation, ηs=97%. Therefore, in the present invention, there can be provided a laser apparatus with its high operation efficiency.

Now, a gain medium will be described below. Hereinafter, the present invention will be described by exemplifying Tm as a rare earth element doped in a gain medium. The rare earth elements which can be used in the present invention can employ inductive discharge transition between the laser high level and the laser low level with two energy levels being higher than the base level. It is sufficient if these two levels are made of self-termination system transition, and at least one of the first and second excitation lights matching the existing semiconductor laser wavelength can be selected in consideration of energy level possessed by ion, without being limited to Tm.

Although it is sufficient if a medium doped with a rare earth element is employed as a medium of a general solid laser or fiber laser, such a medium is generally made of a glass. For example, there can be exemplified quartz, phosphate glass, borate glass, germanium glass, tellurite glass or fluoro zircon ate glass and the like. Among them, fluoro zircon ate glass is preferable because the glass is the lowest in phonon energy, non-radiation transition does not occur even in transition with a small energy difference, and energy can be taken out as light by radiation transition. In addition, when a medium is fiber-formed, a gain can be obtained by its length, and thus, it is desirable that the medium is fiber-shaped.

In this manner, in the laser amplifier according to the present invention, there are provided two light sources for oscillating first and second excitation lights, thereby enabling semiconductor laser excitation. Therefore, there can be eliminated problems caused by employing a light source such as a solid laser or fiber laser as an excitation light source, and operation with high efficiency can be achieved. In addition, the present invention can be configured as a laser oscillator by adding a general resonator structure in addition to a laser amplifier. Further, a plurality of the laser amplifiers are connected in series or parallel, whereby a laser amplification apparatus with its broadened gain in bandwidth can be configured.

As has been described above, according to the present invention, the laser amplifier, laser amplification apparatus, and laser oscillator in which ion forming a self-termination system is doped, enable semiconductor laser excitation, and there can be obtained a laser amplifier, laser amplification apparatus, and laser oscillator with high efficiency, small size, long service life, and high stability. Further, according to the present invention, there can be provided a laser amplifier having its long-wavelength-shifted gain peak wavelength and a laser oscillator having its long-wavelength-shifted oscillation wavelength. Therefore, a fiber amplifier free of a gain peak shift and a fiber amplifier with its shifted gain peak are connected to each other in series or parallel, whereby there can be provided a laser amplification apparatus having its broad amplification wavelength bandwidth. This laser amplification apparatus can be used for multiple wavelength communication that can cope with a large capacity.

DETAILED DESCRIPTION OF THE PREFERRED EMBODIMENTS

Hereinafter, preferred embodiments of the present invention will be described with reference to the accompanying drawings. First, a laser amplifier according to a first embodiment of the present invention will be described. In the present embodiment, a thulium (Tm) doped fluorine fiber is used as an amplification fiber, and attention is paid to transition from $^3F_4$ to $^3H_4$ as discharge light transition.

Figure 3:
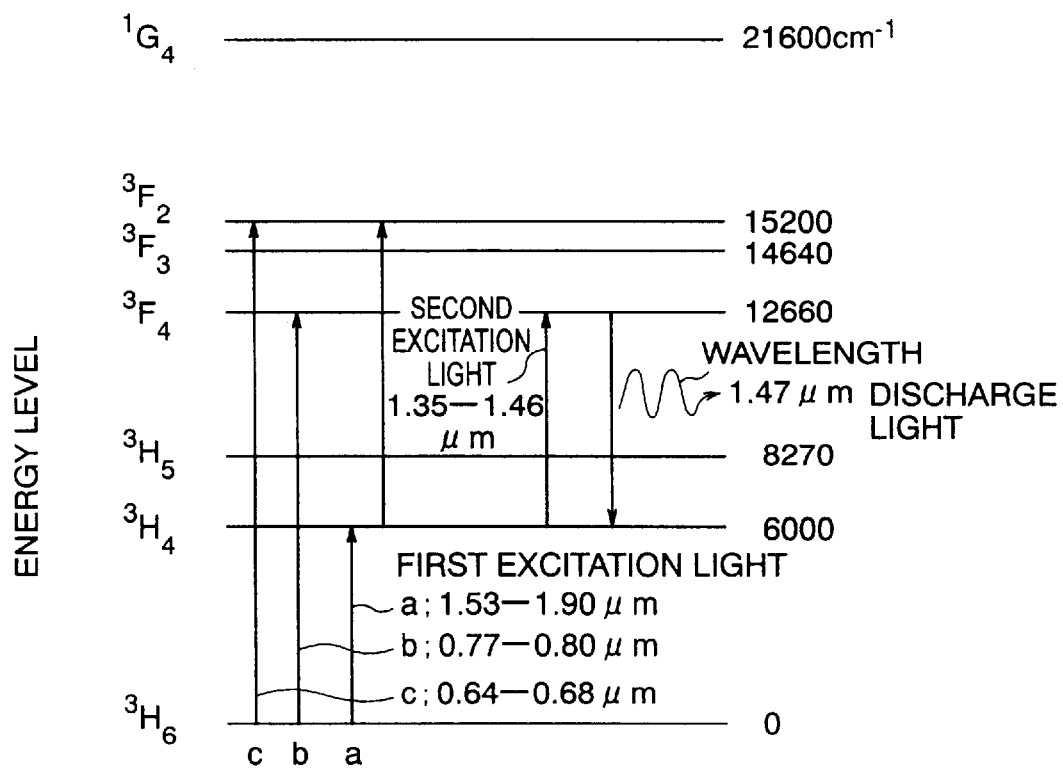
FIG. 3 is an energy level chart showing a method of exciting a laser amplifier according to a first embodiment of the present invention.

FIG. 3 is an energy level chart showing a method of exciting a laser amplifier according to the present embodiment. As shown in FIG. 3, the wavelength of a first excitation light has selections: (1) laser low level ($^3H_4$) excitation wavelength: 1.53 μm to 1.90 μm (transition "a"); (2) $^3H_5$ level excitation wavelength: 1.10 μm to 1.25 μm (not shown); (3) $^3F_4$ level excitation wavelength: 0.77 μm to 0.80 μm (transition "b"); and (4) $^3F_2$ level excitation wavelength: 0.64 μm to 0.68 μm (transition "c") or the like. Among them, (1), (3) and (4) can be subjected to semiconductor laser excitation. The wavelength of a second excitation light may range from 1.35 μm to 1.46 μm that matches excitation level absorption from $^3H_4$ to $^3F_4$, and can be achieved by semiconductor laser.

For example, in the case of the transition "a", the wavelength of the first excitation light may be set so as to have photon energy that corresponds to an energy gap between the base level and $^3H_4$ level. In this base level absorption transition, the wavelength has a peak at a wavelength position of 1.65 μm, and has a field within the range from 1.53 μm to 1.90 μm. In the present embodiment, there is provided a semiconductor laser with its first excitation light source of 1.56 μm in wavelength and 100 mW in maximum yield. This is because a longitudinal multi-mode semiconductor laser can be easily fabricated; passive parts such as an optical coupler or isolator in this wavelength has already been developed; and there is no obstacle in installation. However, a similar operation is essentially possible as long as the above wavelength range is met.

In addition, the wavelength of the second excitation light selects a wavelength that corresponds to an energy gap between the laser low level $^3H_4$ and the laser high level $^3F_4$. This transition is called excitation level absorption. Detailed wavelength data has been measured by the inventor et., al, because the data is not publicly known conventionally. As a result, there was obtained an excitation level absorption spectrum that has a peak in the vicinity of 1.41 μm in wavelength, and that broadens in the range of 1.35 μm to 1.46 μm. The wavelength of the second excitation light may be selected within this wavelength range. A semiconductor laser in the above wavelength band width can be easily fabricated. In the present embodiment, as a second excitation light source, there is used a longitudinal multi-mode LD with 1.42 μm in wavelength which is in the vicinity of excitation level absorption and 100 mW in maximum yield.

Figure 4:
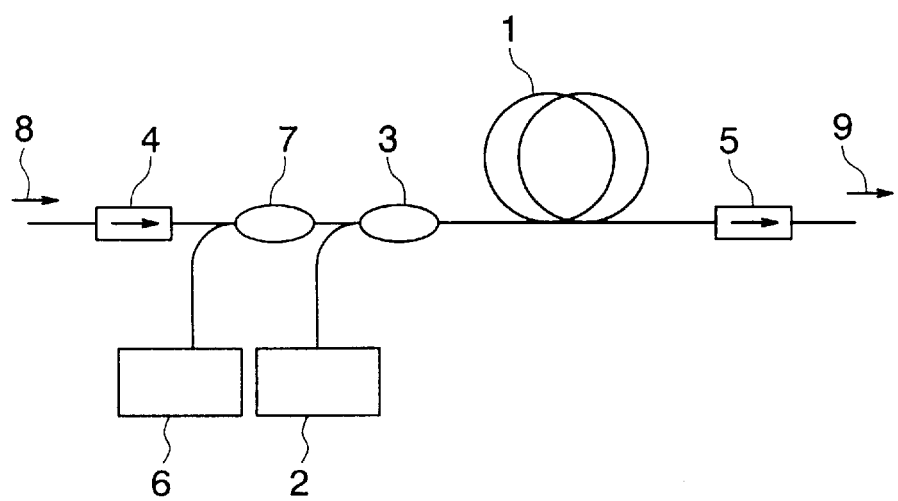
FIG. 4 is a block diagram depicting a configuration of a laser amplifier in the present embodiment.

FIG. 4 is a block diagram depicting a configuration of a laser amplifier according to the present embodiment. An amplification fiber 1 uses a fluoro zircon ate glass as a base material, has thulium density of 2000 ppm, a core diameter of 2.0 μm, and a fiber length of 20 m. Multiple wavelength couplers 3 and 7 are disposed at the input side of the amplification fiber 1. The multiple wavelength couplers 3 and 7 are connected to a first excitation light source 2 and a second excitation light source 6, respectively. An isolator 4 is disposed at a signal input port at the further input side of the multiple wavelength coupler 7, and an isolator 5 is disposed at an output port of the amplification fiber 1, respectively. In FIG. 4, the arrows shown in the isolators 4 and 5 indicate possible light transmission directions in the isolators 4 and 5.

Now, an operation of the laser amplifier according to the present embodiment will be described. A signal light 8 before amplified passes through the isolator 4 of the signal input port, and then, passes through the multiple wavelength couplers 7 and 3 and is introduced into the amplification fiber 1. On the other hand, the excitation lights outputted from the first excitation light source 2 and the second excitation light source 6 are introduced into the amplification fiber 1 via the multiple wavelength couplers 3 and 7, respectively. The signal light 8 is amplified in the amplification fiber 1. The amplified light passes through the isolator 5, and is outputted as an amplification signal 9. The isolators 4 and 5 restrain undesirable laser oscillation due to return light.

Figure 2:
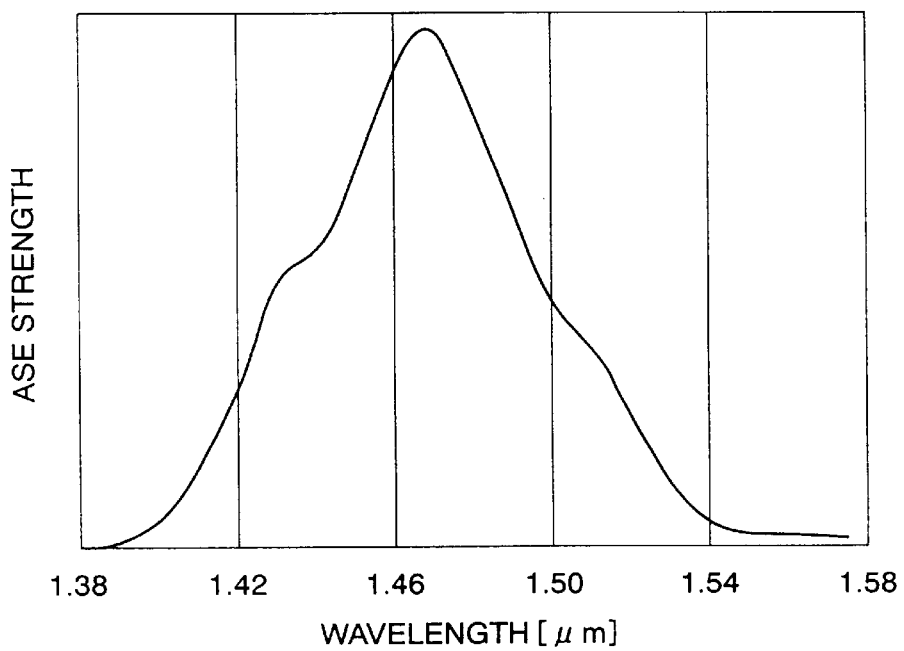
FIG. 2 is a graph illustrating a fluorescence spectrum (ASE spectrum) using a conventional thulium excitation method.
Figure 5:
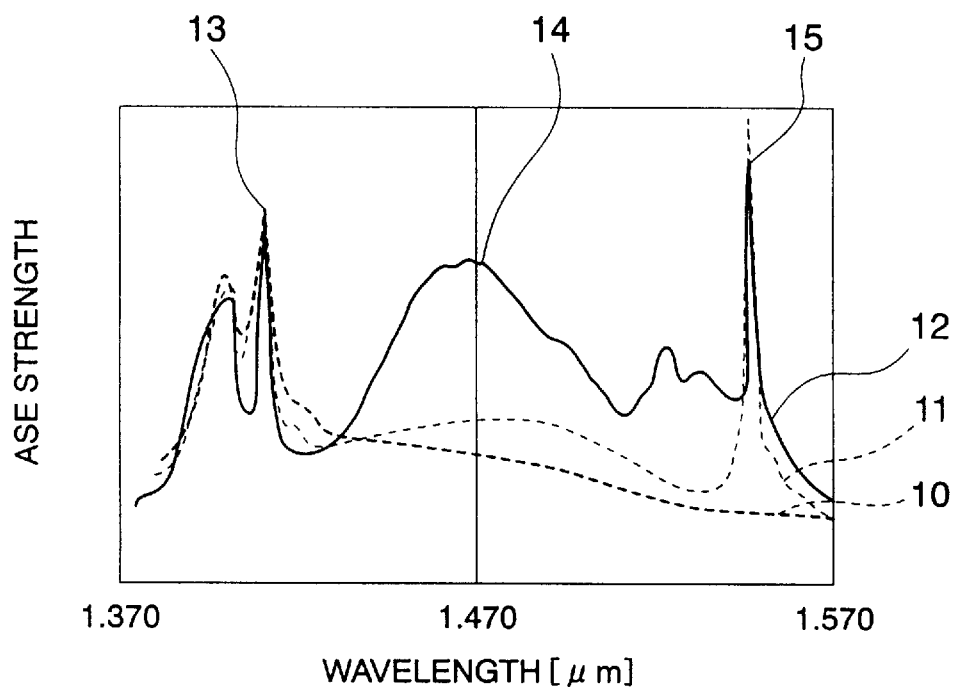
FIG. 5 is a graph illustrating a natural discharge light (ASE) spectrum amplified in the laser amplifier of the present embodiment.

FIG. 5 is a graph depicting an ASE spectrum in the laser amplifier shown in FIG. 4. As shown in FIG. 5, in the case where only the second excitation light (peak 13) is incident without receiving the first excitation light (peak 15), ASE is not generated in the vicinity of 1.470 μm (spectrum 10). However, in the case where both of the first and second excitation lights are incident, a spectrum 12 is obtained. The spectrum 12 has a peak 14 at a wavelength of 1.470 μm. The peak 14 broadens from 1.450 μm to 1.490 μm. Therefore, an ASE bandwidth similar to the ASE spectrum (refer to FIG. 2) in the case of a single wavelength excitation of 1.05 μm was obtained.

In addition, it is possible to control an ASE spectrum by adjusting a yield of the first and/or second excitation lights. When a yield of the first excitation light is defined as 20 mW, and a yield of the second excitation light is defined as 10 mW, a spectrum 11 can be obtained. A peak position is set to 1.485 μm, and is shifted to a long wavelength side as compared with the spectrum 12. The reason can be stated as follows. In the case where the transition strength caused by the first excitation light is strong as compared with the transition strength caused by the second excitation light, the ion number of the laser low level $^3H_4$ increases, and the inversion distribution rate in the fiber is lowered. Therefore, the ASE spectrum is shifted to the long wavelength side. This is the same mechanism as a phenomenon in which, in the case where $^3H_4$ level is regarded as a virtual base level, a decrease in inversion distribution rate causes a long wave shift in a gain bandwidth in an erbium doped fiber amplifier (For example, refer to Japanese Patent Application No. 11-156745. This is not published before the priority date of the corresponding Japanese application.). In addition, in FIG. 4, although excitation light is incident from the input side of the apparatus, it is verified that an effect of the present invention is independent of the incident direction of the excitation light.

Figure 6:
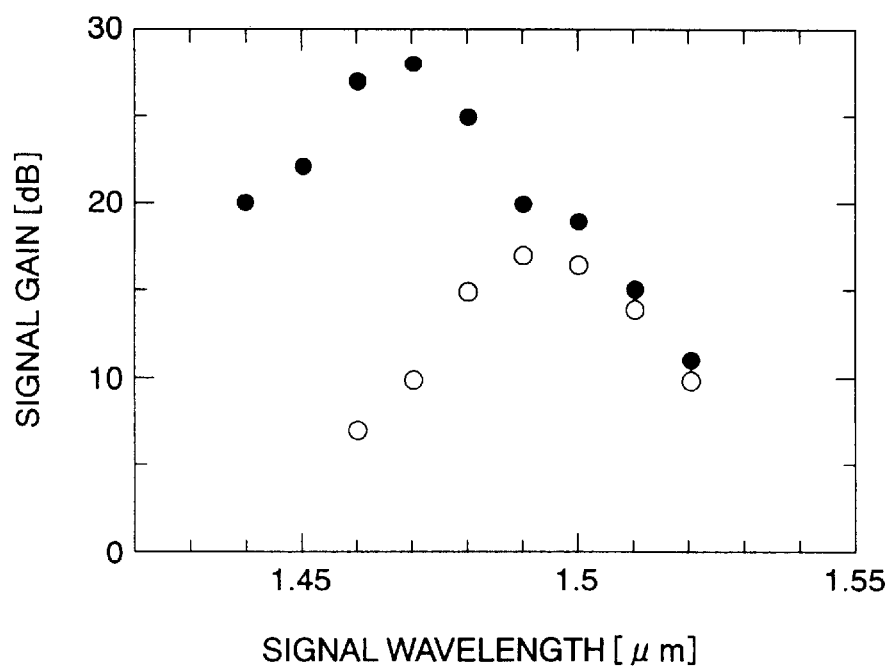
FIG. 6 is a graph illustrating the measurement result of signal wavelength dependency of a gain in the laser amplifier of the present embodiment.

FIG. 6 is a graph depicting the measurement result of gain signal wavelength dependency in the laser amplifier according to the present embodiment. In the measurement, a variable wavelength semiconductor laser is defined as a signal light source, and a wavelength is changed from 1.44 μm to 1.55 μm. An output is defined as −30 dBm. In addition, the wavelength of a saturation signal is set to 1.500 μm, and an output is defined as −10 dBm. As a result, in a signal wavelength of 1.470 μm, about the maximum gain of about 30 dB and a noise index of about 5 dB are obtained (filled circle). At this time, the yield of the first excitation light is 50 mW, and the yield of the second excitation light is 70 mW. In the case of 1.05 μm excitation, in order to obtain a similar gain, the excitation yield from 200 mW to 300 mW is required, which is found to be highly efficient. Assuming that the yield of the first excitation light is 100 mW, and the yield of the second excitation light is 70 mW, the long-wavelength-shift (open circle) of the gain can be achieved similar to the long-wavelength-shift of the ASE spectrum. In this case, although the maximum gain is lowered, such lowering can be compensated for by fiber elongation.

Figure 7:
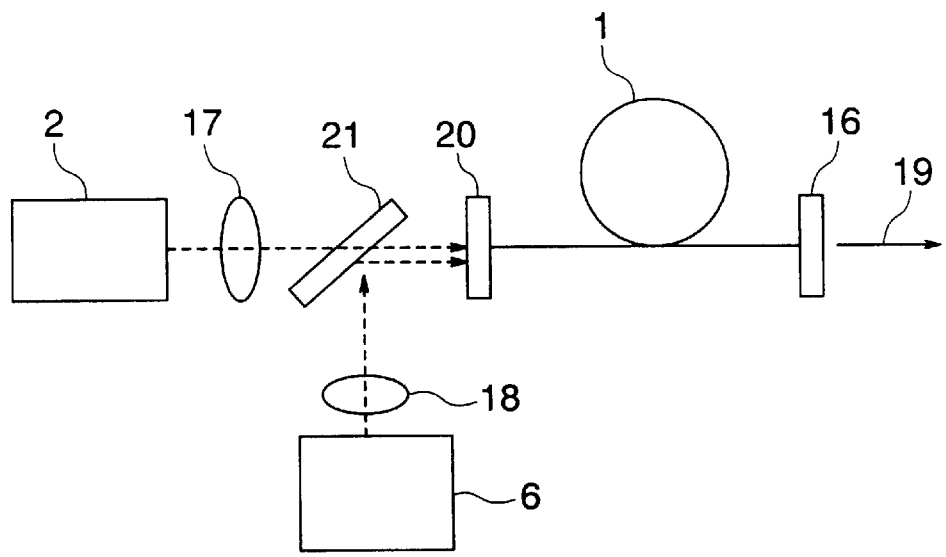
FIG. 7 is a block diagram depicting a configuration of a laser oscillator in a second embodiment of the present invention.

Now, a laser oscillator according to a second embodiment of the present invention will be described below. FIG. 7 is a block diagram depicting a configuration of the laser oscillator in the second embodiment of the present invention. An amplification fiber 1, a first excitation light source 2, and a second excitation light source 6 are identical to those according to the first embodiment. In FIG. 7, like elements in the first embodiment are designated by like reference numerals. A rear mirror 20 that does not reflect at all against the first and second excitation light wavelengths, and that fully reflects against an oscillation wavelength bandwidth (1.47 μm) is installed at the input side of the amplification fiber 1, and an output mirror 16 that partially reflects against the oscillation wavelength bandwidth is provided at the output side of the amplification fiber 1. A dichroic mirror 21 that passes through the first excitation light, and reflects the second excitation light is disposed at the input side of the rear mirror 20, and a lens 17 and a first excitation light source 2 are provided at the further input side. The rear mirror 20, dichroic mirror 21, lens 17 and first excitation light source 2 are disposed on the same straight line. In addition, a lens 18 and a second excitation light source 6 are also provided at the input side of the dichroic mirror 21. The lens 18 and second excitation light source 6 are disposed at a position at which the second excitation light outputted from the second excitation light source 6 passes through the lens 18, is reflected by the dichroic mirror 21, and is incident to the amplification fiber 1 via the rear mirror 20.

Now, an operation of the laser oscillator according to the present embodiment will be described here. The first excitation light outputted from the first excitation light source 2 is incident to the amplification fiber 1 via the lens 17, dichroic mirror 21 and rear mirror 20 after the light has been temporarily radiated in a free space. In addition, the second excitation light outputted from the second excitation light source 6 is incident to the amplification fiber 1 via the lens 18, dichroic mirror 21 and rear mirror 20 after the light has been temporarily radiated in a free space. In the amplification fiber 1, the laser of 1.47 $\mu$m in wavelength is oscillated and amplified, and is outputted as oscillation light 19 from the output mirror 16.

Figure 1:
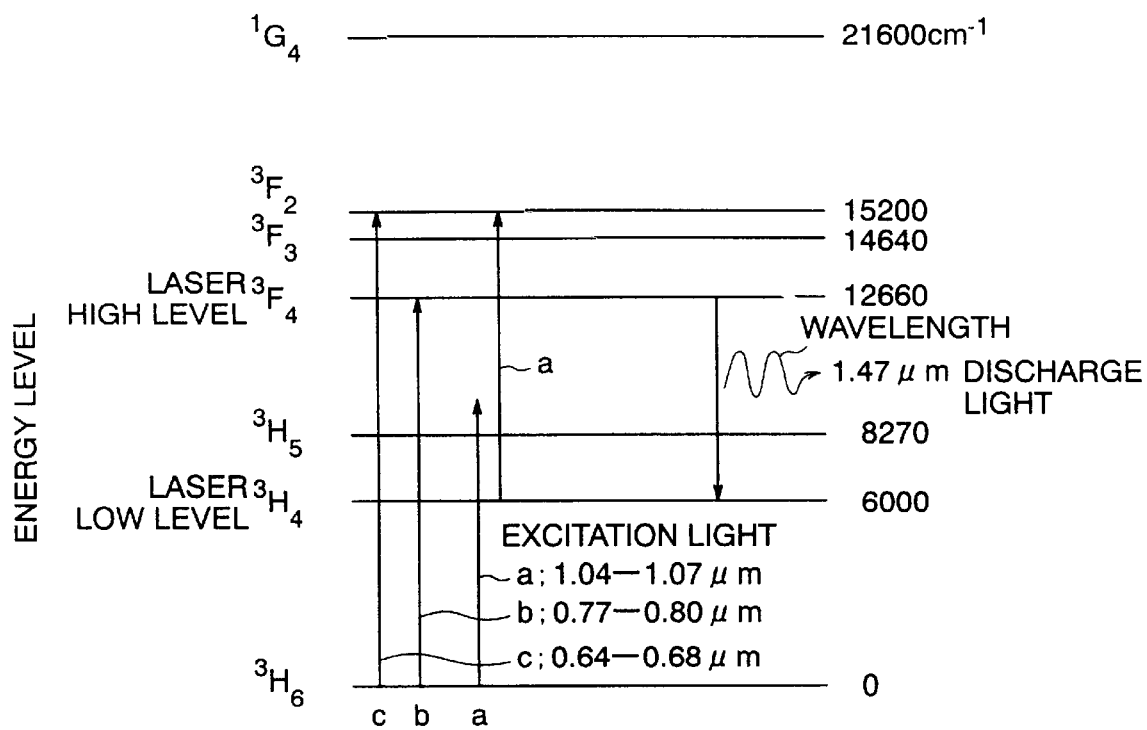
FIG. 1 is an energy level chart showing a method of exciting a conventional thulium fiber amplifier.
Figure 8:
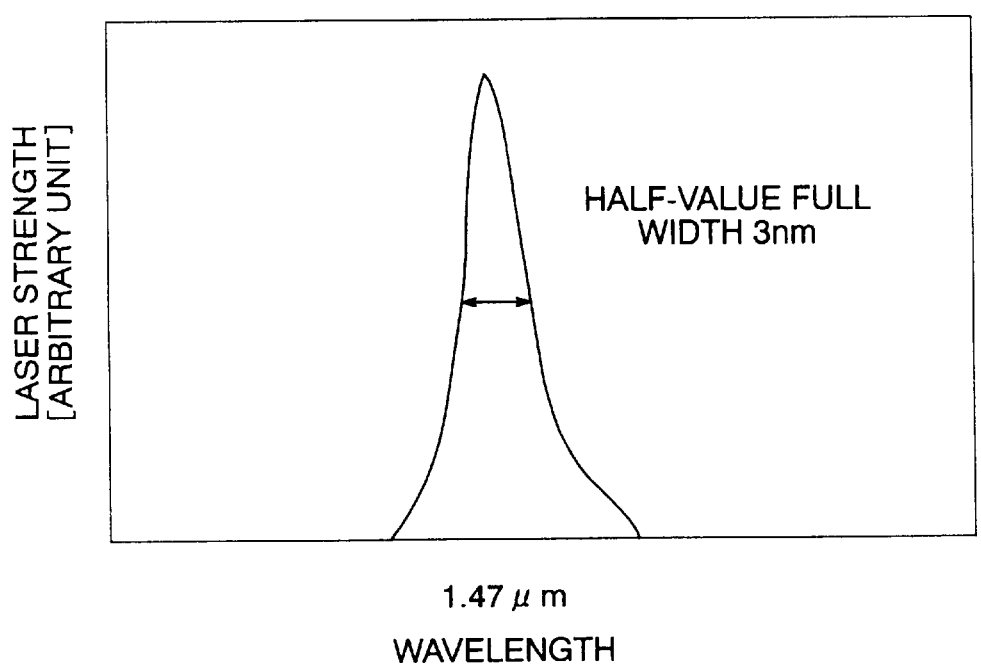
FIG. 8 is a graph illustrating the oscillation spectrum of the laser amplifier in the present embodiment.

FIG. 8 is a graph depicting a laser oscillation spectrum in the present embodiment. By the laser oscillator of the present embodiment, when the excitation power is set to 170 mW, laser oscillation of 1.47 $\mu$m in wavelength and 50 mW in maximum yield can be obtained. Slope efficiency is 35%, and light/light conversion efficiency is 30%. The yield can be increased by optimizing a fiber length. In addition, even in the case where the wavelength of the first excitation light source is defined as 0.79 $\mu$m (transition "b" shown in FIG. 1) or 0.68 $\mu$m (transition "c" shown in FIG. 1), similar gain characteristics can be obtained.

Figure 9:
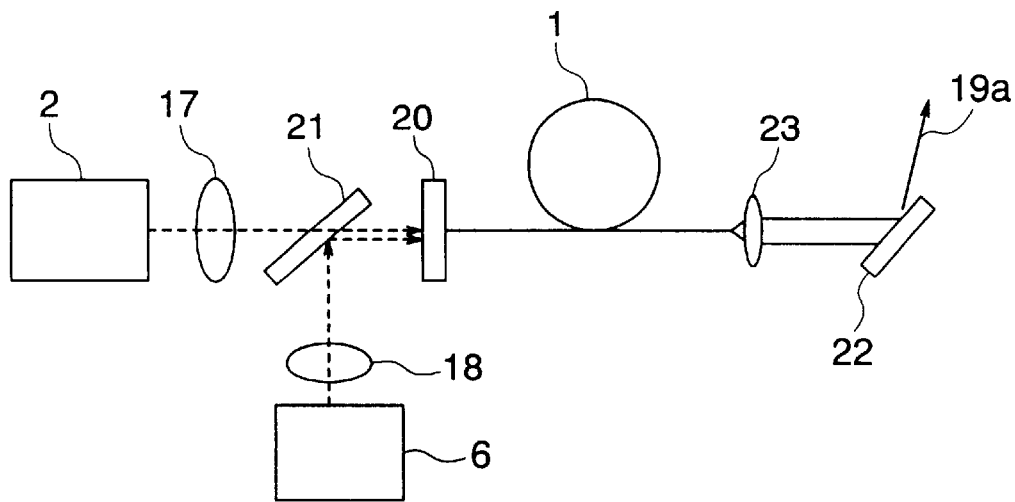
FIG. 9 is a block diagram depicting a configuration of a variable wavelength thulium fiber laser oscillator in a third embodiment of the present invention.

Now, a laser oscillator according to a third embodiment of the present invention will be described. The laser oscillator is a variable wavelength thulium doped fiber laser oscillator. FIG. 9 is a block diagram depicting a configuration of the variable wavelength thulium doped fiber laser oscillator according to the present invention. An amplification fiber 1, first excitation light source 2 and second excitation light source 6 are identical to those according to the first and second embodiments. In FIG. 9, like elements in the second embodiment are designated by like reference numerals. A configuration at the input side of the amplifier fiber 1 is similar to that of the second embodiment. In this third embodiment, a collimating lens 23 and a diffraction lattice 22 are provided at the output end side of the amplification fiber 1.

Now, an operation of the third embodiment will be described. The first excitation light outputted from the first excitation light source 2 is incident to the amplification fiber 1 via the lens 17, dichroic mirror 21 and rear mirror 20 after the light has been temporarily radiated in a free space. The second excitation light outputted from the second excitation light source 6 is incident to the amplification fiber 1 via the lens 18, dichroic mirror 21 and rear mirror 20 after the light has been temporarily radiated in a free space. In the amplification fiber 1, the laser of 1.47 $\mu$m in wavelength is oscillated and amplified, paralleled by a collimating lens 23, and diffracted in a diffraction lattice 22. Then, the wavelength is converted, and is outputted as fiber laser oscillation light 19a.

Figure 10:
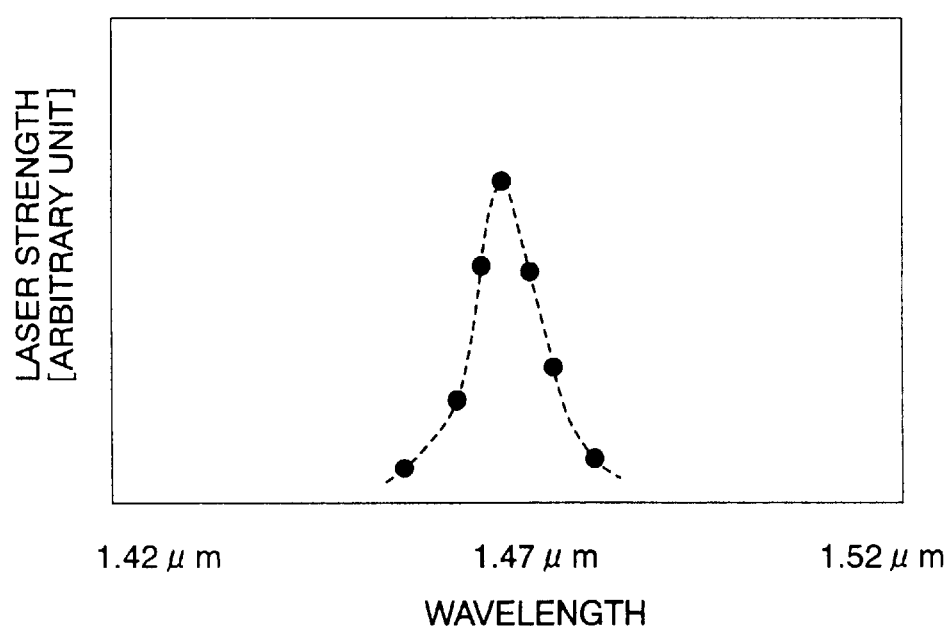
FIG. 10 is a graph illustrating a wavelength tuning curve of the variable wavelength thulium fiber laser oscillator in the present embodiment.

FIG. 10 is a graph depicting a laser wavelength tuning oscillation spectrum in the present embodiment. In the present embodiment, laser oscillation with its arbitrary wavelength from 1.46 $\mu$m to 1.48 $\mu$m can be achieved. For example, laser oscillation of 1.47 $\mu$m in wavelength and 10 mW in maximum yield can be achieved by excitation power of 170 mW.

Figure 11:
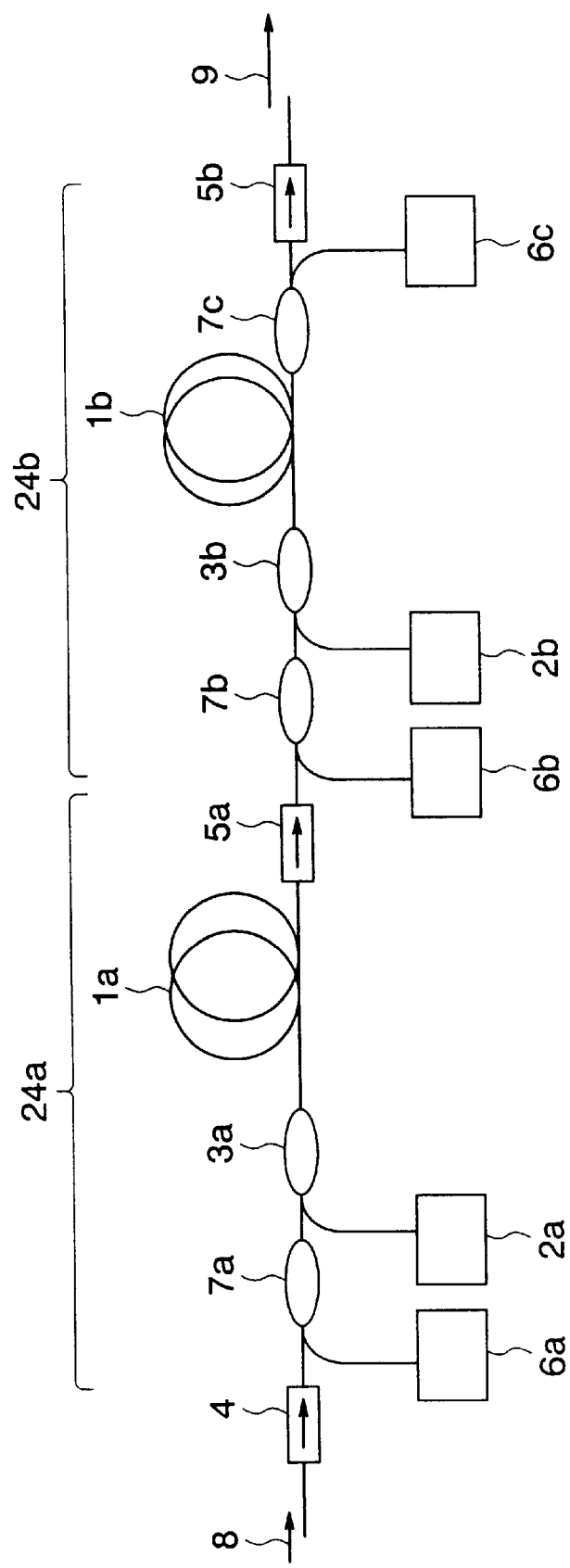
FIG. 11 is a block diagram depicting a configuration of a laser amplification apparatus according to a fourth embodiment of the present invention.

Now, a laser amplification apparatus according to a fourth embodiment of the present invention will be described. FIG. 11 is a block diagram showing a configuration of a laser amplification apparatus according to the present embodiment. The laser amplification apparatus according to the present embodiment is configured by connecting two laser amplifiers (refer to FIG. 4) according to the first embodiment to each other in series. In this manner, a Tm doped fiber is elongated, and the gain bandwidth of the Tm doped fiber amplifier is shifted to the long wave side from 1.47 $\mu$m bandwidth to 1.49 $\mu$m bandwidth.

In the laser amplification apparatus shown in FIG. 11, two laser amplifiers 24a and 24b are disposed in series, and configured at two stages. The laser amplifier 24a is disposed at the input side relevant to the laser amplifier 24b. The amplification fibers 1a and 1b are optical fibers that use a fluoro zircon ate glass as a base material, and that has thulium density of 2000 ppm, core diameter of 2.0 $\mu$m, and fiber length of 20 m. In the laser amplification apparatus of the present embodiment, the amplification fibers 1a and 1b are connected to each other in series, thereby having a total fiber length of 40 m.

The amplification fiber 1a is provided in the laser amplifier 24a, and multiple wavelength couplers 3a and 7a are provided at the input side of the amplification fiber 1a. The multiple wavelength couplers 3a and 7a are connected to first and second excitation light sources 2a and 6a, respectively. An isolator 4 is provided at the signal input port at further input side of the multiple wavelength coupler 7a and an isolator 5a is provided at the output port of the amplification fiber 1. The laser amplifier 24b is connected to the output side of the isolator 5a. In addition, the first and second excitation light sources 2a and 6a introduce the first and second excitation lights, respectively, from the input side to the amplification fiber 1a.

In the laser amplifier 24b, multiple wavelength couplers 7b and 3b, amplification fiber 1b, multiple wavelength coupler 7c and isolator 5b are provided in order from the input side, and are connected to each other in series. A second excitation light source 6b and a first excitation light source 2b are connected to the multiple wavelength couplers 7b and 3b, respectively, and the second excitation light source 6c is connected to the multiple wavelength coupler 7c. The first excitation light source 2b and second excitation light source 6b introduce first and second excitation lights, respectively, from the input side to the amplification fiber 1b. The second excitation light source 6c introduces second excitation light as a backward excitation light source from the output side into the amplification fiber 1b. The first excitation light sources 2a and 2b are identical to the first excitation light source 2 in the first embodiment, and the second excitation light sources 6a to 6c are identical to the second excitation light source 6 in the first embodiment. The isolators 4, 5a and 5b restrain undesirable laser oscillation due to return light. In FIG. 11, the arrows shown in the isolators 4, 5a and 5b indicate possible light transmission directions in the isolators 4, 5a and 5b.

Now, an operation of the laser amplification apparatus according to the present embodiment will be described. As shown in FIG. 11, a signal light 8 before amplified is inputted to a laser amplifier 24a, and passes through the isolator 4. Then, the light passes through the multiple wavelength couplers 7a and 3a, and is introduced into the amplification fiber 1a. On the other hand, the excitation lights outputted from the second excitation light source 6a and the first excitation light source 2a are introduced into the amplification fiber 1a via the multiple wavelength couplers 7a and 3a, respectively. The signal light 8 is amplified in the amplification fiber 1a. The amplified light then passes through the isolator 5a, and is outputted to the laser amplifier 24b.

The light outputted from the laser amplifier 24a passes through the multiple wavelength couplers 7b and 3b, and is introduced into the amplification fiber 1b in the laser amplifier 24b. On the other hand, the excitation lights outputted from the second excitation light source 6b and first excitation light source 2b are introduced into the amplification fiber 1b, respectively, via the multiple wavelength couplers 7b and 3b. In addition, the excitation light outputted from the second excitation light source 6c is introduced into the amplification fiber 1b via the multiple wavelength coupler 7c. The above-mentioned light outputted from the laser amplifier 24a is amplified in the amplification fiber 1b. The amplified light passes through the isolator 5b, and is outputted as an amplification signal 9.

Figure 12:
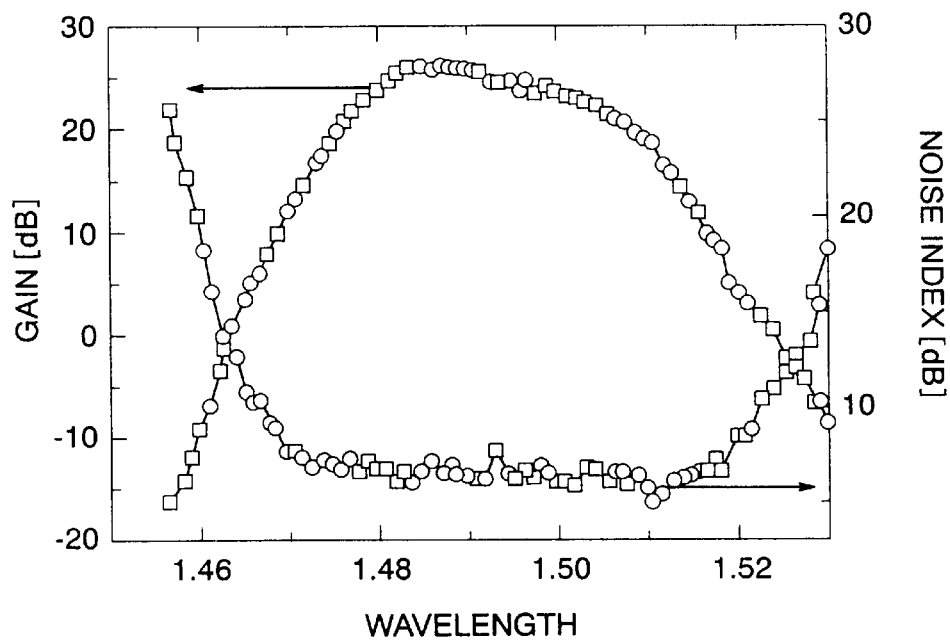
FIG. 12 is a graph illustrating the measurement result of wavelength dependency of a gain and noise index in the laser amplification apparatus in the present embodiment.

FIG. 12 is a graph depicting the measurement result of gain and noise index wavelength dependency of an amplification signal 9 in a laser amplification apparatus shown in FIG. 11. In the measurement, a multiple wavelength signal consisting of 16 waves in which the wavelengths are disposed in the range from 1.476 $\mu$m to 1.509 $\mu$m with equal intervals as a saturation signal; and a variable wavelength semiconductor laser light of −20 dBm in yield as a small signal are inputted to the laser amplification apparatus all together. The multiple wavelength signal is −15 dBm/ch in output of each wave, and −3 dBm in a total yields of all input signals. At this time, the yield of the first excitation light source 2a is 12 mW; the yield of the first excitation light source 2b is 1.1 mW; the yield of the second excitation light source 6a is 93 mW; the yield of the second excitation light source 6b is 107 mW; and the yield of the second excitation light source 6c is 267 mW. In addition, the gain and noise index are measured for changing the wavelength of the small signal. As a result of the measurement, when the signal wavelength is 1.490 $\mu$m, the maximum gain value is obtained. At this time, the gain is about 26 dB, and the noise index is about 6.5 dB. In addition, when the wavelength is within the range from 1.477 $\mu$m to 1.507 $\mu$m, the gain of 20 dB or more can be obtained.

Figure 13:
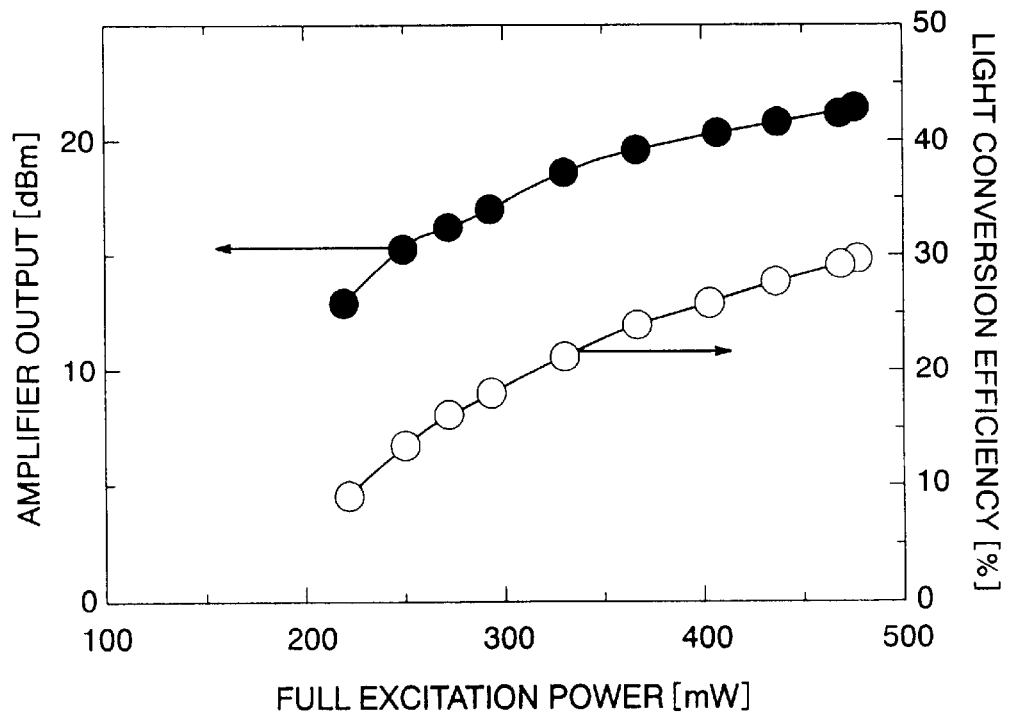
FIG. 13 is a graph illustrating full-excitation power dependency of yield and light conversion efficiency of the laser amplification apparatus in the present embodiment.

FIG. 13 is a graph illustrating full excitation power dependency of the yield and light conversion efficiency of the laser amplification apparatus according to the present embodiment. Full excitation power is a summation of yields from the first excitation light sources 2a and 2b and the second excitation light sources 6a, 6b and 6c. Light conversion efficiency is a value obtained by dividing an output of the laser amplification apparatus by full excitation power. At this time, the yield and light conversion efficiency of the laser amplification apparatus increase monotonously relevant to full excitation power. When the full excitation power is maximal, the yield and efficiency become maximal. At this time, the light conversion efficiency reaches a maximum of 29%. This value is highly efficient as compared with 1.05 $\mu$m excitation.

The present invention is efficient in transition between other excitation levels in the above-mentioned Tm ion and other rare earth ion by appropriately selecting the rare earth ion, and the wavelength and strength of the first excitation light source and the wavelength and strength of the second excitation light source, capable of achieving desired inductive discharge transition.

What is claimed is:

1. A laser amplifier using a medium doped with a rare earth element as a gain medium, and employing inductive discharge transition between two energy levels higher than a base level among energy levels of rare earth ion in the medium, the inductive discharge transition forming a self-termination system transition whose laser low level service life of the two energy levels is longer than laser high level service life of the two energy levels, said laser amplifier comprising:

a first excitation light source for exciting ion from the base level to the low level or an energy upper level higher than the laser low level;

a second excitation light source having a wavelength different from that of the first excitation light source and for exciting ion from the laser low level to the laser high level, wherein at least one of the first and second excitation light sources is composed of a semiconductor laser;

multiple wavelength couplers for introducing the first and second excitation light sources into the amplification fiber;

isolators that restrain undesirable laser oscillation due to return light; and an amplification fiber.

2. The laser amplifier according to claim 1, wherein fluoro zirconate glass is used as the medium doped with a rare earth element.

3. The laser amplifier according to claim 1, wherein the rare earth ion is thulium ion ($Tm^{3+}$) and the first excitation light source has any one of three wavelength ranges from 1.53 $\mu$m to 1.90 $\mu$m, 0.77 $\mu$m to 0.80 $\mu$m and 0.64 $\mu$m to 0.68 $\mu$m and the second excitation light source has a wavelength range of 1.35 $\mu$m to 1.46 $\mu$m.

4. The laser amplifier according to claim 1, wherein the medium is formed in an optical fiber shape.

5. A laser amplification method, comprising the step of arranging a plurality of laser amplifiers, in series or parallel to broaden a gain in bandwidth at least one of said plurality of laser amplifiers using a medium doped with a rare earth element as a gain medium, and employing inductive discharge transition between two energy levels higher than a base level among energy levels of rare earth ion in the medium, the inductive discharge transition forming a self-termination system transition whose laser low level service life of the two energy levels is longer that laser high level service life of the two energy levels, said laser amplifier comprising a first excitation light source for exciting ion from the base level to the low level or an energy upper level higher than the laser low level;

a second excitation light source having a wavelength different from that of the first excitation light source and for exciting ion from the laser low level to the laser high level, wherein at least one of the first and second excitation light sources is composed of a semiconductor laser;

multiple wavelength couplers for introducing the first and second excitation light sources into the amplification fiber;

isolators that restrain undesirable laser oscillation due to return light; and an amplification fiber.

6. A laser amplification apparatus, comprising a plurality of laser amplifiers arranged in series or parallel, at least one of said plurality of laser amplifiers using a medium doped with a rare earth element as a gain medium, and employing inductive discharge transition between two energy levels higher than a base level among energy levels of rare earth ion in the medium, the inductive discharge transition forming a self-termination system transition whose laser low level service life of the two energy levels is longer that laser high level service life of the two energy levels, said laser amplifier comprising
- a first excitation light source for exciting ion from the base level to the low level or an energy upper level higher than the laser low level;
- a second excitation light source having a wavelength different from that of the first excitation light source and for exciting ion from the laser low level to the laser high level, wherein at least one of the first and second excitation light sources is composed of a semiconductor laser;
- multiple wavelength couplers for introducing the first and second excitation light sources into the amplification fiber;
- isolators that restrain undesirable laser oscillation due to return light; and
- an amplification fiber.

7. A laser oscillator using a medium doped with a rare earth element as a gain medium, and employing inductive discharge transition between two energy levels higher than a base level among energy levels of the rare earth ion in the medium, the inductive discharge transition forming a self-termination system transition whose laser low level service life of the two energy levels is longer than laser high level service life of the two energy levels, said laser oscillator comprising:

- a first excitation light source for exciting ion from the base level to the laser low level or an energy upper level higher than the laser low level;
- a second excitation light source having a wavelength different from that of the first excitation light source and for exciting ion from the laser low level to the laser high level, wherein at least one of the first and second excitation light sources is composed of a semiconductor laser;
- a rear mirror that fully reflects against the oscillation bandwidth;
- an output mirror that partially reflects against the oscillation bandwidth;
- a dichroic mirror that fully reflects the second excitation light source and passes through the first excitation light source; and
- an amplification fiber.

8. A laser oscillator according to claim 7, wherein fluoro zirconate glass is used as the medium doped with a rare earth element.

9. A laser oscillator according to claim 7, wherein the rare earth ion is thulium ion ($Tm^{3+}$) and the first excitation light source has any one of three wavelength ranges from 1.53 $\mu$m to 1.90 $\mu$m, 0.77 $\mu$m to 0.80 $\mu$m and 0.64 $\mu$m to 0.68 $\mu$m and the second excitation light source has a wavelength range of 1.35 $\mu$m to 1.46 $\mu$m.

10. A laser oscillator according to claim 7, wherein the medium is formed in an optical fiber shape.

* * * * *